(12) United States Patent
Gollier et al.

(10) Patent No.: US 9,573,842 B2
(45) Date of Patent: Feb. 21, 2017

(54) TRANSPARENT GLASS SUBSTRATE HAVING ANTIGLARE SURFACE

(75) Inventors: Jacques Gollier, Painted Post, NY (US); Shandon Dee Hart, Corning, NY (US); Alan Thomas Stephens, II, Beaver Dams, NY (US); James Andrew West, Painted Post, NY (US)

(73) Assignee: Corning Incorporated, Corning, NY (US)

(*) Notice: Subject to any disclaimer, the term of this patent is extended or adjusted under 35 U.S.C. 154(b) by 959 days.

(21) Appl. No.: 13/466,390

(22) Filed: May 8, 2012

(65) Prior Publication Data

US 2012/0300304 A1    Nov. 29, 2012

Related U.S. Application Data

(60) Provisional application No. 61/490,678, filed on May 27, 2011.

(51) Int. Cl.
  *G02B 1/10* (2015.01)
  *C03C 15/00* (2006.01)
  *G02B 1/118* (2015.01)
  *C03C 21/00* (2006.01)

(52) U.S. Cl.
  CPC ............ *C03C 15/00* (2013.01); *C03C 21/002* (2013.01); *G02B 1/118* (2013.01); *C03C 2204/08* (2013.01)

(58) Field of Classification Search
  CPC ............ G02B 5/02–5/0294; G02B 1/01–1/18; G02B 5/20–5/289; G02B 5/18–5/1895; G02B 6/00–6/0096; G02F 1/1335–1/133567; G02F 2201/133507–2201/133567

USPC .................... 359/577–590, 601–615
  See application file for complete search history.

(56) References Cited

U.S. PATENT DOCUMENTS

| | | | | |
|---|---|---|---|---|
| 7,258,908 | B2* | 8/2007 | Kuwabara et al. ............ 428/141 |
| 2003/0077437 | A1* | 4/2003 | Nakamura ............. B82Y 20/00 |
| | | | | 428/327 |
| 2005/0122589 | A1* | 6/2005 | Bakker ..................... G02B 1/11 |
| | | | | 359/591 |

(Continued)

FOREIGN PATENT DOCUMENTS

| JP | 2006306656 | 11/2006 |
|---|---|---|
| WO | 0202472 A1 | 1/2002 |

(Continued)

OTHER PUBLICATIONS

U.S. Appl. No. 12/858,544, filed Aug. 18, 2010, Carlson, Krista L., et al.
U.S. Appl. No. 12/730,502, filed Sep. 30, 2010, Carlson, Krista L., et al.
U.S. Appl. No. 61/329,936, filed Apr. 30, 2010, Guilfoyle, Diane K., et al.

(Continued)

*Primary Examiner* — Bumsuk Won
*Assistant Examiner* — Jeffrey Madonna
(74) *Attorney, Agent, or Firm* — Payal A. Patel; Jie Gao

(57) ABSTRACT

A transparent glass substrate having an antiglare surface that minimizes sparkle. The antiglare surface has a roughened portion that surface that has a RMS amplitude of at least amplitude of at least about 80 nm. The antiglare surface may also include a portion that is unroughened, or flat. The fraction of the antiglare surface that is roughened is at least about 0.9, and the fraction of the surface that is unroughened is less than about 0.10. The antiglare surface has a pixel power deviation of less than about 7%.

21 Claims, 11 Drawing Sheets

(56) References Cited

U.S. PATENT DOCUMENTS

| | | | |
|---|---|---|---|
| 2006/0001971 A1* | 1/2006 | Schadt | G02B 5/0221 359/537 |
| 2008/0186582 A1* | 8/2008 | Matsuura | G02F 1/133502 359/601 |
| 2009/0197048 A1 | 8/2009 | Amin et al. | |
| 2010/0073604 A1* | 3/2010 | Okuyama | B29D 11/00644 349/75 |
| 2010/0246016 A1 | 9/2010 | Carlson et al. | |
| 2010/0254715 A1* | 10/2010 | Yamashita | H04B 10/50572 398/188 |
| 2010/0285275 A1 | 11/2010 | Baca et al. | |
| 2011/0062849 A1 | 3/2011 | Carlson et al. | |
| 2012/0301609 A1* | 11/2012 | Yamamoto | G02B 5/3008 427/164 |
| 2013/0027780 A1* | 1/2013 | Iwata | G02B 1/118 359/601 |

FOREIGN PATENT DOCUMENTS

| | | |
|---|---|---|
| WO | 2011137141 A1 | 11/2011 |
| WO | 2011137144 A1 | 11/2011 |

OTHER PUBLICATIONS

U.S. Appl. No. 61/329,951, filed Apr. 30, 2010, Kohli, Jeffrey T., et al.
U.S. Appl. No. 61/372,655, filed Aug. 11, 2010, Guilfoyle, Diane K., et al.
U.S. Appl. No. 61/447,285, filed Feb. 28, 2011, Gollier, Jacques et al.
ASTM D1003-11, Standard Test Method for Haze and Luminous Transmittance of Transparent Plastics.
CN201280025738.2 Office Action Dated Aug. 5, 2015.
PCT/US2012/039025 Search Report dated Aug. 21, 2012.
TW101118369 Search Report Dated Mar. 14, 2016.

* cited by examiner

TRANSPARENT GLASS SUBSTRATE HAVING ANTIGLARE SURFACE

CROSS-REFERENCE TO RELATED APPLICATIONS

This application claims the benefit of priority under 35 U.S.C. §119 of U.S. Provisional Application Ser. No. 61/490,678 filed on May 27, 2011, the content of which is relied upon and incorporated herein by reference in its entirety.

BACKGROUND

The disclosure relates to a transparent substrate having antiglare properties. More particularly, the disclosure relates to a transparent glass substrate having an antiglare surface.

Antiglare surfaces are often used in display applications such as LCD screens or OLEDs to avoid or reduce specular reflection of ambient light. These antiglare surfaces are typically formed by providing some degree of roughness to spread light reflected by the surface over a certain angle. Antiglare surfaces used in display applications typically comprise a coated or structured polymeric film (often a polarizing film) that is directly laminated to the surface of the front glass sheet forming an LCD or OLED.

Random noise may be generated in an image viewed through such an antiglare surface due to either excessive roughness of the surface or the shape of the features that form the roughened surface. Such noise is generally called "sparkle" and can be characterized by a number referred to as the pixel power deviation (PPD). In addition, the roughness of the antiglare surface can generate other image artifacts, such as image resolution degradation or black image contrast reduction.

SUMMARY

The present disclosure provides a transparent glass substrate having an antiglare surface that minimizes sparkle and other forms of transmitted image degradation. Various antiglare surface parameters and display combinations that minimize the negative effects on the transmitted image while retaining the beneficial anti-glare blurring of reflected images are described. The antiglare surface has a roughened portion that has a RMS amplitude of at least about 80 nm. The antiglare surface may also include a portion that is unroughened or flat. The fraction of the antiglare surface that is roughened (the roughened portion) is at least about 0.9, and the fraction of the surface that is unroughened is less than about 0.10. The antiglare surface has a pixel power deviation of less than about 7%.

Accordingly, one aspect of the disclosure is to provide a transparent glass substrate having an antiglare surface. The antiglare surface comprises: a roughened surface. The roughened surface has an RMS amplitude of at least about 80 nm; and a frequency cutoff of less than about $[1/(0.081 \times RMS)]$, wherein the frequency cutoff is expressed in microns and RMS is the RMS amplitude of the roughened surface, expressed in nanometers.

Another aspect of the disclosure is to provide a display assembly. The display assembly comprises: a pixelated display, the pixelated display comprising a plurality of pixels having a pixel pitch; and a transparent glass substrate having an antiglare surface. The transparent glass substrate is disposed in front of the pixelated display and separated from the pixelated display by a predetermined distance. The antiglare surface is opposite a surface of the transparent glass substrate facing the pixelated display. The antiglare surface has a roughened surface. The roughened surface has an RMS amplitude of at least about 80 nm and a cutoff frequency of greater than $[(280/P) \times (0.098 \times RMS - 5.55)]$, wherein P is the pixel pitch P, expressed in microns, and RMS is the RMS amplitude of the roughened surface, expressed in nanometers.

These and other aspects, advantages, and salient features will become apparent from the following detailed description, the accompanying drawings, and the appended claims.

BRIEF DESCRIPTION OF THE DRAWINGS

FIG. 4a is an interferometry image of a homogenous roughened surface;

FIG. 4b is a profile of the homogeneous roughened surface shown in FIG. 4a;

FIG. 4c an interferometry image of a non-homogenous surface;

FIG. 4d is a profile of the non-homogeneous roughened surface shown in FIG. 4c;

DETAILED DESCRIPTION

Figure 1:
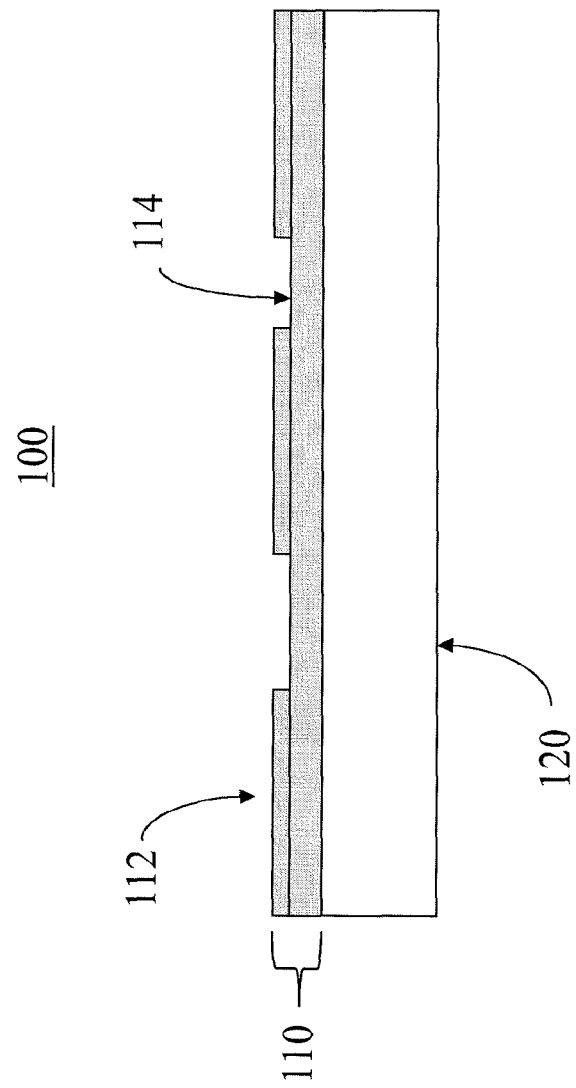
FIG. 1 is a schematic representation of a cross-sectional view of a transparent substrate having an antiglare surface.

In the following description, like reference characters designate like or corresponding parts throughout the several views shown in the figures. It is also understood that, unless otherwise specified, terms such as "top," "bottom," "outward," "inward," and the like are words of convenience and are not to be construed as limiting terms. In addition, whenever a group is described as comprising at least one of a group of elements and combinations thereof, it is understood that the group may comprise, consist essentially of, or consist of any number of those elements recited, either individually or in combination with each other. Similarly, whenever a group is described as consisting of at least one of a group of elements or combinations thereof, it is understood that the group may consist of any number of those elements recited, either individually or in combination with each other. Unless otherwise specified, a range of values, when recited, includes both the upper and lower limits of the range and any sub-ranges therebetween. As used herein, the indefinite articles "a," "an," and the corresponding definite article "the" mean "at least one" or "one or more," unless otherwise specified.

Referring to the drawings in general and to FIG. 1 in particular, it will be understood that the illustrations are for the purpose of describing particular embodiments and are not intended to limit the disclosure or appended claims thereto. The drawings are not necessarily to scale, and certain features and certain views of the drawings may be shown exaggerated in scale or in schematic in the interest of clarity and conciseness.

As previously mentioned hereinabove, antiglare surfaces typically comprise a coated or structured polymeric film that is directly laminated to the surface of the front glass sheet of a LCD or OLED. The parameters and processes used for such antiglare polymeric coatings are not necessarily the same as the parameters for a protective antiglare cover glass or substrate, as the antiglare surface on a protective cover glass or substrate is typically placed at a larger optical distance from the image-forming plane of the display device.

Accordingly, a transparent glass substrate having an antiglare surface is provided and described herein. A cross-sectional view of a transparent glass substrate 100 (also referred to herein as a "glass substrate" or "substrate") is schematically shown in FIG. 1. Substrate 100 has an antiglare surface 110 and a second surface 120 opposed to antiglare surface 110. Antiglare surface 110 may be integral to substrate, or may be applied as a free-standing film or deposited layer on the face of substrate 100.

The fundamental objective of antiglare surface 110 of transparent glass substrate 100 is to eliminate the Fresnel reflection of a cover glass and/or pixelated display such as, for example, a LCD display, when viewed through the glass substrate 100. The antiglare surface 110 replaces the Fresnel reflection with a diffused reflection that blurs the images of objects in the display. Accordingly, the roughness amplitude of antiglare surface 100 is sufficiently high to eliminate specular Fresnel reflections. For substantially random surfaces, the attenuation factor of the specular reflection is a function only of the RMS amplitude of the roughness and does not significantly depend on the shape of the roughness. The attenuation factor is given by the equation:

$$R = R0 \exp(-(2\Pi\delta \cdot \Delta n \cdot \cos(\theta)/\lambda)2),$$

where $\delta$ is the RMS amplitude of the roughness, $\theta$ is the angle of incidence of light of wavelength $\lambda$ on the surface, and n is the index of refraction, wherein $\Delta n = 2$ in reflection and $\Delta n = 1-n$ in transmission.

Figure 2:
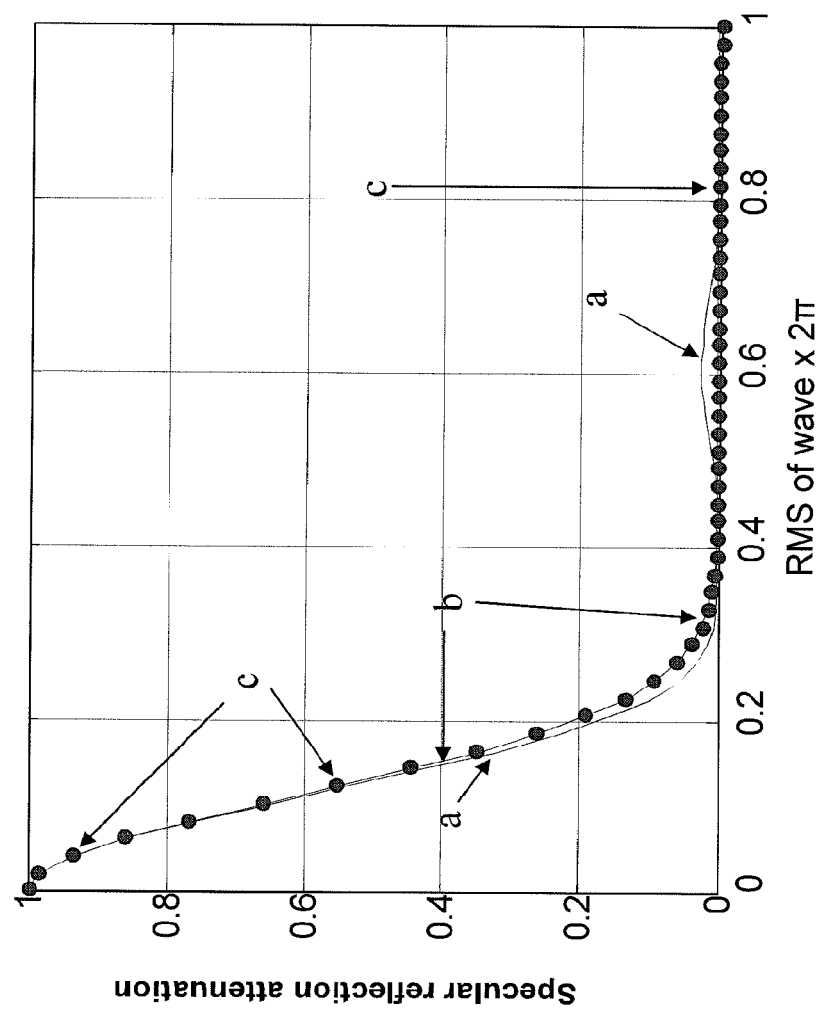
FIG. 2 is a plot of the specular reflection attenuation factor as a function of RMS wave units.

Fourier optics-based models can be applied to determine the specular reflection attenuation factor at normal incidence (i.e., $\theta = 0$). FIG. 2 is a plot of the specular reflection attenuation factor as a function of RMS wave units, expressed in multiples of $2\pi$. The attenuation factor is calculated for a sinusoidal roughness (a in FIG. 2), random surface roughness (b in FIG. 2), and using an approximation formula (c). Based on the attenuation factors shown in FIG. 1, in order to eliminate specular reflection, $\delta\Delta n/\lambda => 0.3$, and the RMS amplitude $\delta$ of the roughness is greater than about 80 nm.

In order to eliminate specular reflection at larger incidence angles, the above relationship becomes $\delta \cdot \cos(\theta)$. To eliminate specular reflection for illumination angles of up to 60°, for example, the RMS amplitude $\delta$ of the roughness should be greater than about 160 nm. The "ideal" RMS roughness of the antiglare surface may vary from one application to the next. For example, antiglare surfaces for computer screens, which are mostly viewed at normal incidence, may have a roughness on the order of about 80 nm, whereas antiglare surfaces for hand-held electronic devices or televisions, which may be viewed at large angles, may have a RMS roughness on the order of about 160 nm.

Accordingly, antiglare surface 110 comprises a roughened surface portion 112 (FIG. 1) having a RMS amplitude of at least about 80 nm. The RMS roughness amplitude or "roughness amplitude" is given by the expression $$\text{RMS} = \sqrt{\int (R(x,y) - \text{mean}(R(x,y)))^2 / S},$$

where R(x,y) is the roughness function and S is the surface over which the integral is calculated. The roughened surface portion 112 may be formed by chemically etching a surface of the transparent glass substrate 100, either directly or through an acid- or alkali-resistant mask.

Depending on the process that is used to form antiglare surface 110, the surface may, in some instances, not be entirely covered by AG rough features; i.e., the antiglare surface is not homogenous. When the surface of the transparent glass substrate is etched through a mask deposited on the surface, for example, holes are created at locations on the surface where openings in the mask exist. Consequently, a significant portion of the surface may not be etched (i.e., "unetched" or "unroughened"), resulting in regions 114 of the antiglare surface 110 that are substantially flat. The roughness of antiglare surface 110 is therefore not, in some instances, homogeneously distributed.

Figure 3:
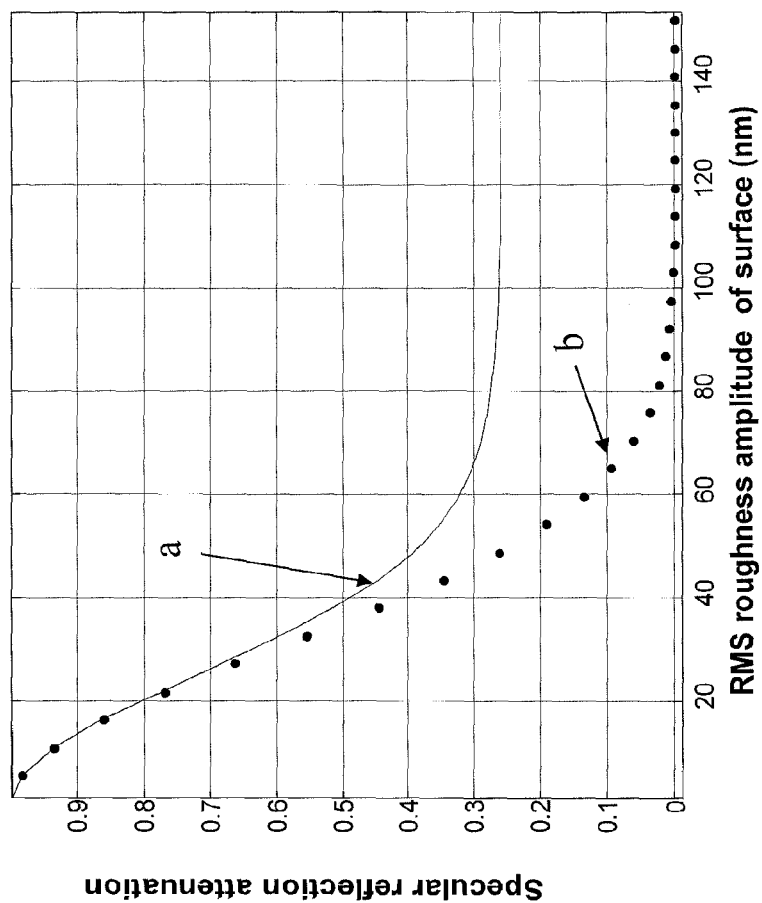
FIG. 3 is a plot of specular reflection amplitude as a function of RMS roughness amplitude for non-homogeneous and homogenous surfaces.

Specular reflection amplitude is plotted in FIG. 3 as a function of the RMS amplitude $\delta$ of roughness for non-homogeneous (a in FIG. 3) and homogenous surfaces (b in FIG. 3) when a Fourier optics-based model is applied. While the specular reflection calculated for homogenous surfaces (a in FIG. 3) falls to zero, the specular reflection calculated for non-homogeneous surfaces (b in FIG. 3) saturates at a non-zero value. The uncoverage ratio ($\tau$) is the ratio of the surface area not covered by antiglare features (i.e., the unroughened or flat surface) to the surface area covered with antiglare features (i.e., the roughened surface). The value at which the specular reflection saturates is equal to the square of the uncoverage ratio $\tau$. The uncoverage ratio $\tau$ should be less than about 0.1 in order to achieve a specular reflection of less than or equal to about 1%.

Figure 4:
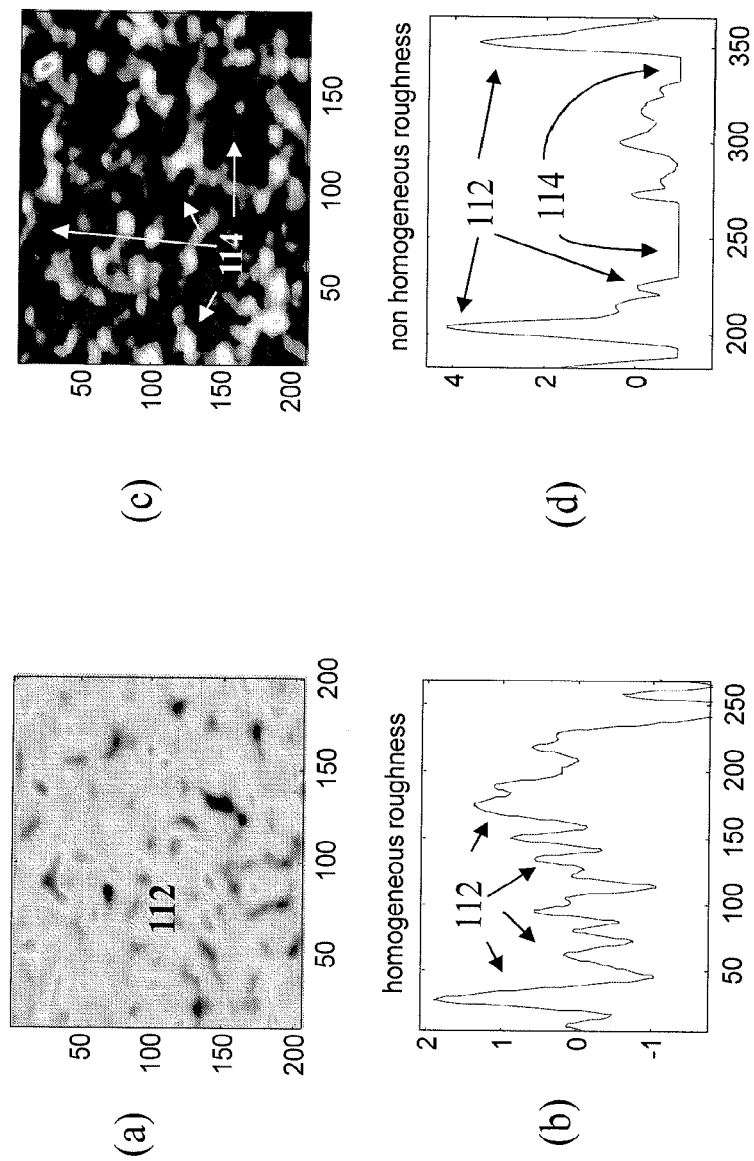

Accordingly, antiglare surface 110 may be non-homogenous and further include an unroughened or substantially flat surface portion 114. The presence of flat surface portions 114 is typically the result of etching the surface of the glass substrate 100 through a mask. FIGS. 4a and 4b are an image and a plot of the profile, respectively, of a homogeneous roughened antiglare surface. FIGS. 4c and 4d are an image and a plot of the profile, respectively, of an antiglare surface resulting from etching the surface of the glass substrate through a mask. The non-homogeneous antiglare surfaces shown in FIGS. 4c and 4d include unetched, substantially flat surface portions 114, each having a minimum surface area of about 1 μm², as well as roughened surface portions 112. In some embodiments, the uncoverage ratio $\tau$, or fraction of the antiglare surface 110 comprising flat surface portion 114, is less than about 0.1; i.e., flat surface portion 114 comprise less than about 10% of the antiglare surface 110, with the roughened surface comprising the remainder of the antiglare surface 110. In some embodiments, the uncoverage ratio $\tau$ is less than about 0.2.

Once the RMS amplitude $\delta$ of the roughness of the antiglare surface 110 has been set to the proper value to eliminate specular reflections, the ideal diffusion angle in which light passing through the antiglare surface 110 is scattered in reflection is determined. The diffusion angle of the antiglare surface is maximized in order to make reflected images of objects surrounding a pixelated display as blurry as possible when viewed in reflection from the transparent glass substrate 100 and antiglare surface 110. To achieve this, the antiglare surface 110 should have a RMS roughness amplitude and frequency content that are as large as possible. However, the roughness amplitude and frequency content should be balanced against other considerations so as not to degrade the image being viewed on the pixelated display.

Figure 5:
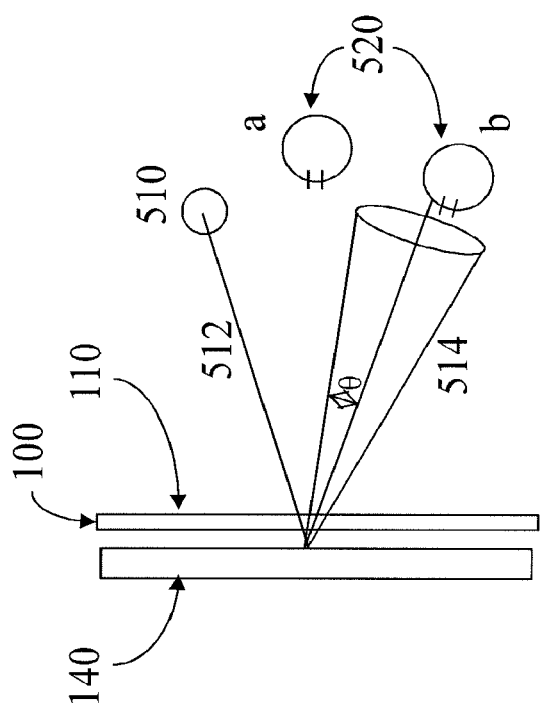
FIG. 5 is a schematic representation of a pixelated display illuminated by a small light source through a substrate having an antiglare surface.

In a normal environment, a pixelated display is viewed in a room that is illuminated by light sources that are very bright and small such as, for example, a light bulb, plus a very large size source, such as surrounding white walls that scatter light coming from the light bulb. Because of the extreme brightness of such sources, a direct reflection coming from the punctual light sources in the room and collection by the eye of an observer should be avoided. FIG. 5 shows a situation where the pixelated display 140 screen is illuminated in reflection from substrate 100 with antiglare surface 110 by a small light source 510. Light 512 is scattered into a cone 514 having an angular aperture θ. When an observer eye 520 is outside cone 514 (position a in FIG. 5), light source 510 will not be seen by the observer. When observer eye 520 is inside cone 514 (position b in FIG. 5), light source 510 will be seen by the observer.

Assuming that light sources 510 are randomly distributed around the pixelated display 140, the probability of seeing light source 510 in reflection increases as the angle θ increases. This probability P is given in first approximation by $P(\theta)=\sin^2 \theta$. The maximum scattering angle of the antiglare surface 110 can be calculated by: a) assuming a nearly Gaussian angular energy distribution for scattering; b) defining the diffusion cone 514 by the $1/e^2$ value; c) assuming a random distribution of light sources 510 around the pixelated display; and d) calculating the probability of the observer eye 520 being within that diffusion cone.

Figure 6:
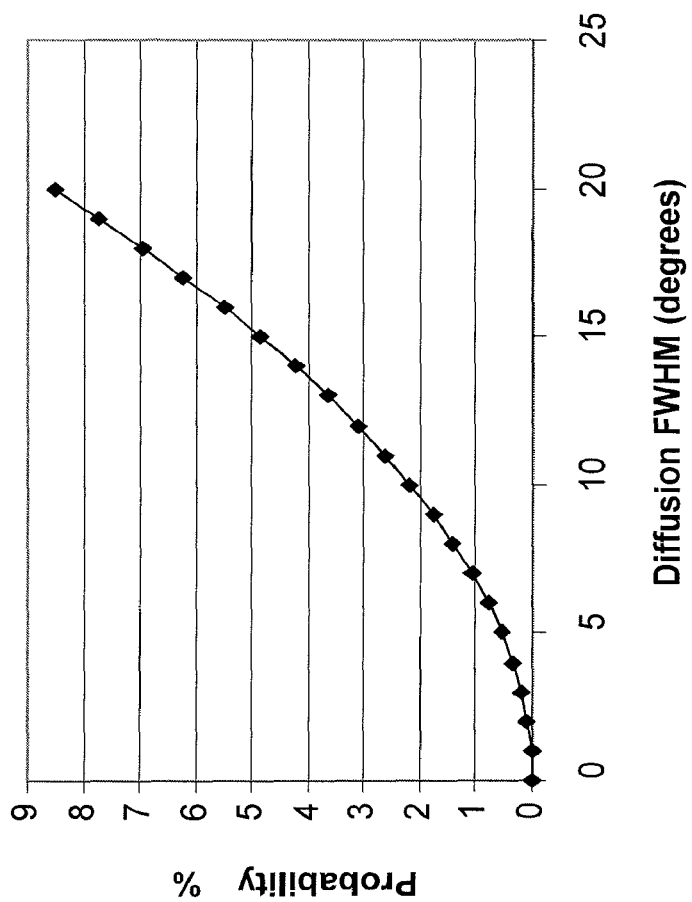
FIG. 6 is a plot of the probability of an observer eye being inside a diffusion cone as a function of the full width half maximum (FWHM) of the angular energy distribution in reflection.

In one embodiment, the full width half maximum (FWHM) of the angular energy distribution in reflection is less than about 7° and, in other embodiments, less than about 7.5°. FIG. 6 is a plot of the probability of the observer eye 520 being inside diffusion cone 514 as a function of the FWHM, expressed in degrees. Based on the data plotted in FIG. 6, the FWHM of the diffusion angular energy distribution should be less than about 7.5° in order to keep probability below 1%. Alternatively, a one-dimensional (cross-sectional) slice of the reflected angular energy distribution of less than about 25% of the reflected energy should be outside 7.5°. This is equivalent to the FWHM condition in the case of a Gaussian profile, but is more general in that it is relevant to non-Gaussian profiles as well. in another alternative, which is even more robust to non-Gaussian profiles, a one-dimensional (cross-sectional) slice of the reflected angular energy distribution of less than about 5% of the reflected energy should be outside a 12.5° cone (12.5° is approximately the $1/e^2$ angle corresponding to a FWHM of 7.5°).

Figure 7:
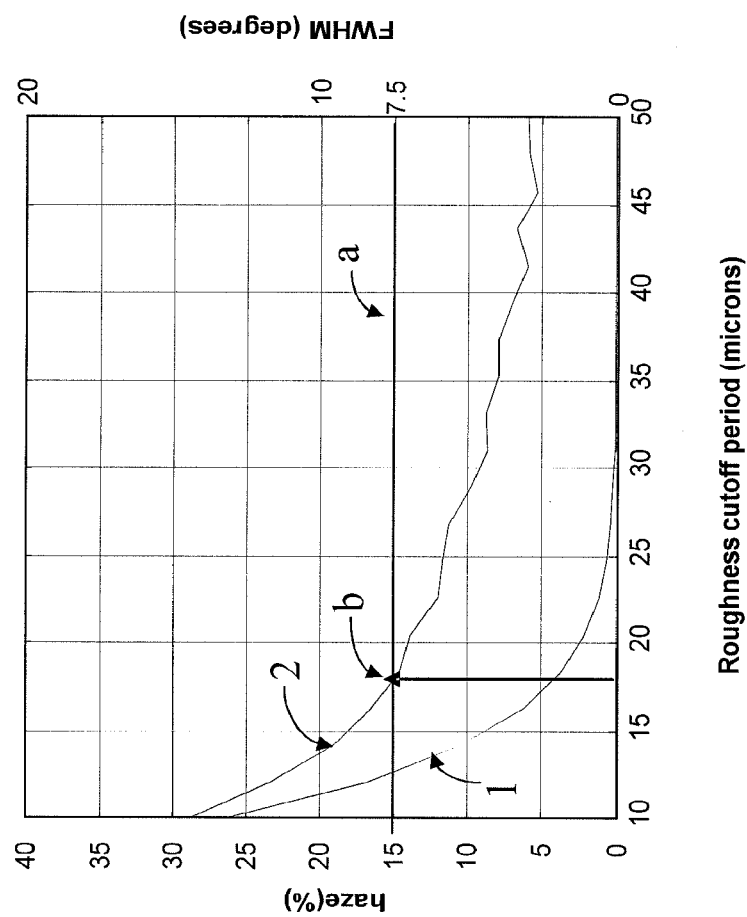
FIG. 7 is a plot of percent haze and FWHM of the diffusion energy distribution as functions of roughness cutoff period.

The diffusion angle in reflection is a function of two parameters: the RMS amplitude of the roughness and the frequency cutoff, which is defined as the frequency at which the power spectral density of the roughness falls below $1/e^2$. FIG. 7 is a plot of percent haze (line 1, left axis) and FWHM (line 2, right axis) of the diffusion energy distribution as functions of roughness frequency cutoff at a fixed RMS amplitude of 250 nm. For this specific roughness amplitude, the frequency cutoff should be lower than about $\frac{1}{18}$ microns$^{-1}$ (corresponding to a cutoff period of 18 μm (point b in FIG. 7)) in order to achieve a FWHM of less than about 7.5° (line a in FIG. 7). As used herein, the term "haze" refers to the percentage of transmitted light scattered outside an angular cone of about ±2.5° in accordance with ASTM procedure D1003, entitled "Standard Test Method for Haze and Luminous Transmittance of Transparent Plastics," the contents of which are incorporated by reference herein in their entirety. In some embodiments, the transparent substrate and antiglare surface described herein have a transmission haze, measured in accordance with ASTM procedure D1003, of less than about 20% and, in other embodiments, less than about 5%.

Figure 8:
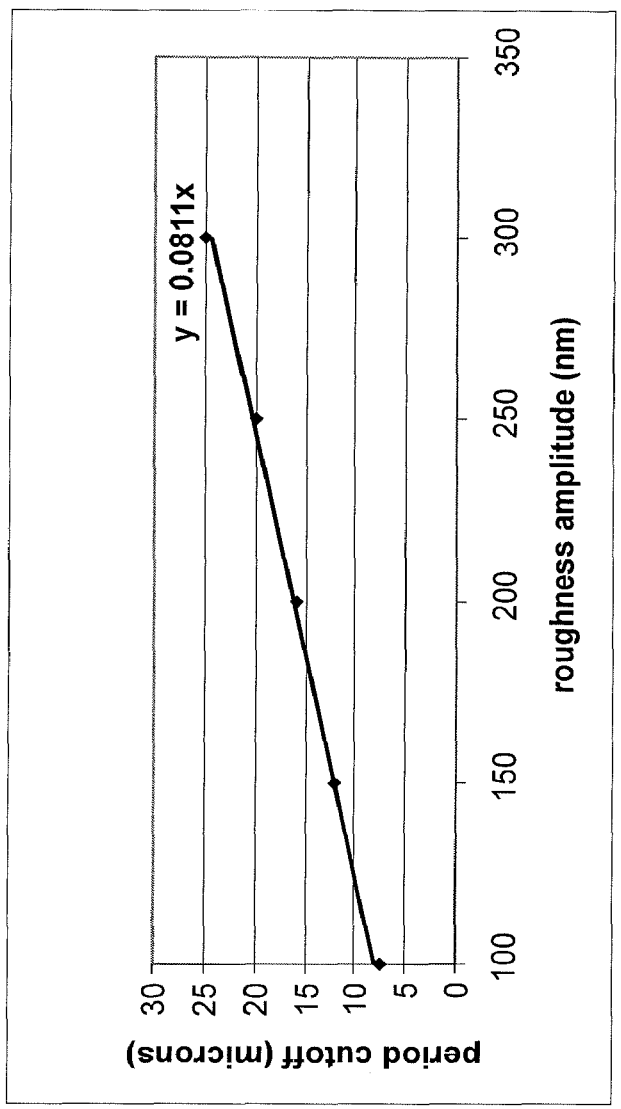
FIG. 8 is a plot of the cutoff period as a function of RMS amplitude of the roughness.

The dependence of the FWHM of the angular energy distribution in reflection upon frequency cutoff may also be expressed in terms of the cutoff period, wherein the period (1/ν) is defined as the inverse of the frequency ν. The cutoff period is plotted as a function of RMS amplitude of the roughness in FIG. 8. The condition that the FWHM of the angular energy distribution in reflection is less than about 7° or, in some embodiments, less than about 7.5°, may therefore be expressed in terms of the frequency cutoff which, in some embodiments is less that about 1/(0.081 RMS), where RMS is expressed in nm and the frequency cutoff is expressed in microns$^{-1}$.

Figure 9:
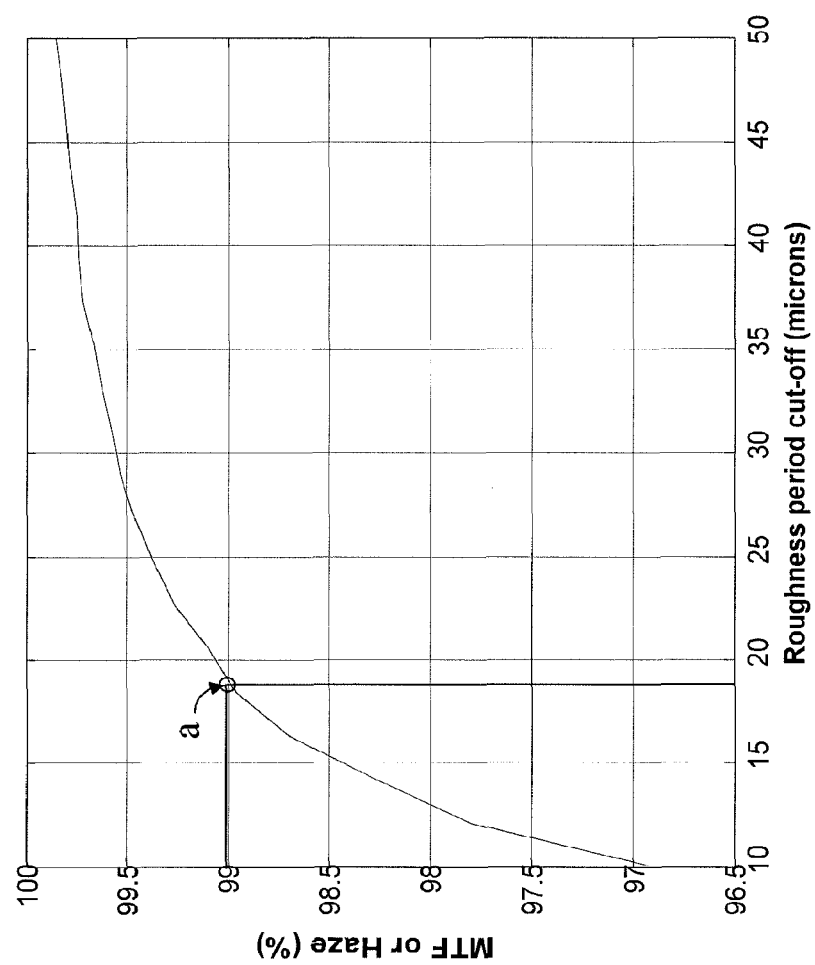
FIG. 9 is a plot of the evolution the modulation transfer function (MTF) calculated at the Nyquist frequency as a function of roughness cutoff period.

Image resolution should not be degraded or decreased by the antiglare surface. The degree to which the antiglare surface degrades the image may be quantified by considering the highest spatial frequency that a pixelated display can produce (referred to as the Nyquist frequency, which is the inverse of twice (2×) the pixel pitch) and calculating the modulation transfer function (MTF) degradation associated with the antiglare surface at that frequency. The evolution of MTF calculated at the Nyquist frequency is plotted in FIG. 9 as a function of the roughness frequency cutoff. Among the assumptions made in this particular case are that pixel pitch is 280 μm and the entire stack thickness (optical distance from pixels to the antiglare surface) of the LCD display is 3 mm. RMS amplitude of the roughness of the antiglare surface was fixed at 250 nm. Based on the data plotted in FIG. 9, the antiglare surface described herein should have a frequency cutoff of less than $\frac{1}{18}$ microns$^{-1}$ (or cutoff period greater than 18 μm) in order to achieve FWHM of 7.5°, or a degradation in MTF of 1% (point a in FIG. 9). The optical distance can be measured, for example, using a microscope that can be moved along its optical axis. The microscope is first adjusted at a first distance, at which point the image of the rough surface is in focus. The microscope is then focused at a second distance, at which point the image of the pixels is in focus. The optical distance is the difference between the first distance and the second distance.

Figure 10:
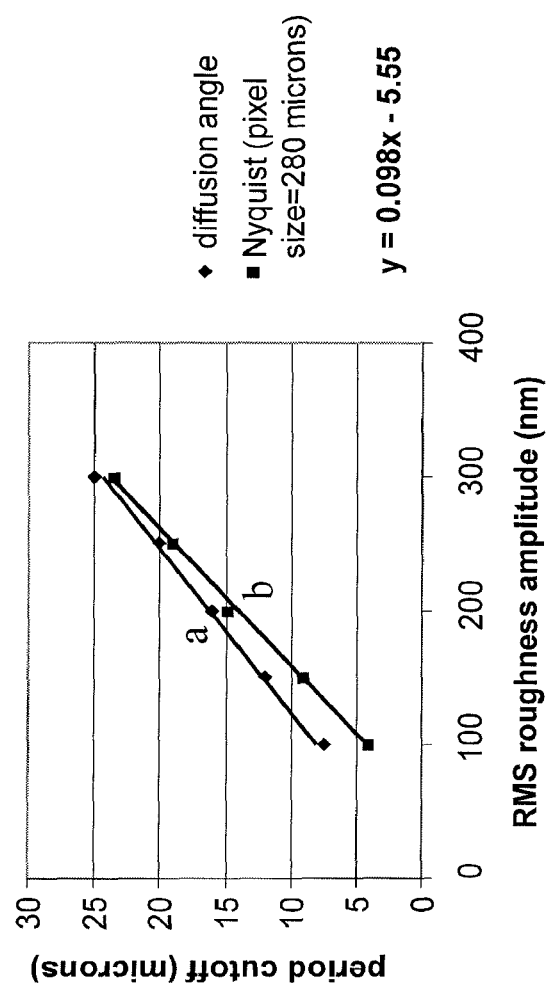
FIG. 10 is a plot of cutoff period as a function of RMS roughness amplitude.

The maximum cutoff frequency that corresponds to a 1% MTF degradation at the Nyquist frequency can also be calculated as a function of the RMS amplitude of the roughness. FIG. 10, for example, shows the minimum cutoff period necessary to meet the limitation that the frequency cutoff should be lower than 1/(0.081 RMS) (a in FIG. 10) and the Nyquist condition (b in FIG. 10), where the pixel pitch is fixed at 280 μm. The results shown in FIG. 10 can be expanded to other pixel pitches, due to the fact that the cutoff period is inversely proportional to the pixel pitch. Accordingly, the substrate and antiglare surface described herein has a cutoff period, expressed in microns, that is greater than (280/Pixel)·(0.098 RMS−5.55), where Pixel is the LCD pixel pitch (expressed in microns), and RMS is the RMS amplitude of the roughness, expressed in nm. The above relationship between cutoff period, pixel pitch P and RMS amplitude is valid only for an optical distance of 3 mm. In a first approximation, the maximum cutoff period is expected to be proportional to the optical distance. More generally, the cutoff period, expressed in microns, is greater than (280/Pixel)·(0.098 RMS−5.55)·D/3, where D is the optical distance expressed in mm.

When the antiglare surface has a relatively low spatial frequency, the roughness begins to act like a plurality of lenses that generates an image artifact called "sparkle". Display "sparkle" or "dazzle" is a generally undesirable side effect that can occur when introducing antiglare or light scattering surfaces into a pixelated display system such as, for example, a LCD, an OLED, touch screens, or the like, and differs in type and origin from the type of "sparkle" or "speckle" that has been observed and characterized in projection or laser systems. Sparkle is associated with a very fine grainy appearance of the display, and may appear to have a shift in the pattern of the grains with changing viewing angle of the display. Display sparkle may be manifested as bright and dark or colored spots at approximately the pixel-level size scale.

As used herein, the terms "pixel power deviation" and "PPD" refer to the quantitative measurement for display sparkle. PPD is calculated by image analysis of display pixels according to the following procedure. A grid box is drawn around each LCD pixel. The total power within each grid box is then calculated from the CCD camera data and assigned as the total power for each pixel. The total power for each LCD pixel thus becomes an array of numbers, for which the mean and standard deviation may be calculated. The PPD value is defined as the standard deviation of total power per pixel divided by the mean power per pixel (times 100). The total power collected from each LCD pixel by the eye simulator camera is measured and the standard deviation of total pixel power (PPD) is calculated across the measurement area, which typically comprises about 30×30 LCD pixels.

The details of a measurement system and image processing calculation that are used to obtain PPD values are described in U.S. Provisional Patent Application No. 61/447,285, filed on Feb. 28, 2011, by Jacques Gollier et al., and entitled "Apparatus and Method for Determining Sparkle," the contents of which are incorporated by reference herein in their entirety. The measurement system includes: a pixelated source comprising a plurality of pixels, wherein each of the plurality of pixels has referenced indices i and j; and an imaging system optically disposed along an optical path originating from the pixelated source. The imaging system comprises: an imaging device disposed along the optical path and having a pixelated sensitive area comprising a second plurality of pixels, wherein each of the second plurality of pixels are referenced with indices m and n; and a diaphragm disposed on the optical path between the pixelated source and the imaging device, wherein the diaphragm is has an adjustable collection angle for an image originating in the pixelated source. The image processing calculation includes: acquiring a pixelated image of the transparent sample, the pixelated image comprising a plurality of pixels; determining boundaries between adjacent pixels in the pixelated image; integrating within the boundaries to obtain an integrated energy for each source pixel in the pixelated image; and calculating a standard deviation of the integrated energy for each source pixel, wherein the standard deviation is the power per pixel dispersion.

Figure 11:
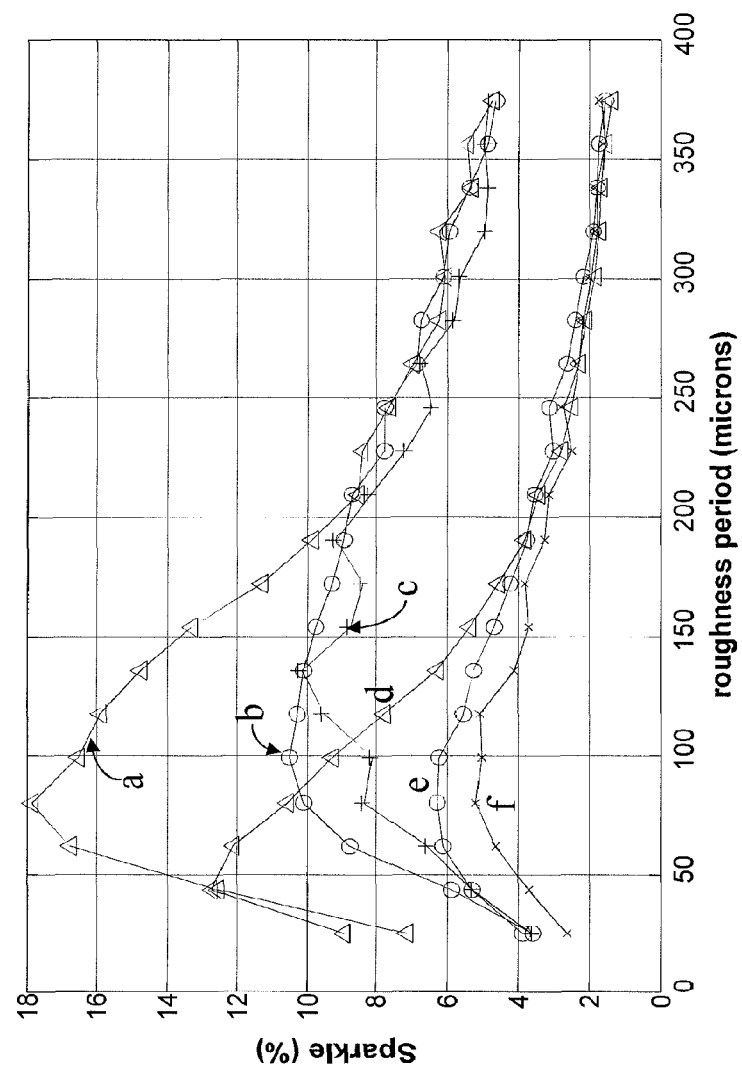
FIG. 11 is a plot of sparkle amplitude as a function of roughness period.

Sparkle amplitude is plotted as a function of the roughness period in FIG. 11 for roughened surfaces having RMS roughness amplitudes of 250 nm (curves a, b, c, in FIG. 11) and 100 nm (curves d, e, f in FIG. 11) for a fixed optical distance of 3 mm. For each roughness, sparkle was measured for pixel pitches of 140 µm (curves a and b in FIG. 11), 220 µm (curves b and e), and 280 µm (curves c and f).

The curves plotted in FIG. 11 reveal the presence of two different roughness cutoff frequencies that can minimize the sparkle amplitude. The first cutoff frequency where very low levels of sparkle are generated is located at very low frequencies (i.e., large periods). At cutoff periods in the 200-300 µm range, the diffusion divergence angle in reflection is extremely low and results in an antiglare surface that does not significantly blur images in reflection. Furthermore, at very large spatial periods, the antiglare surface may have a rough, textured appearance referred to as "orange peel" that is distracting to the human eye.

The second cutoff frequency is at high frequencies (i.e., small periods). At frequencies greater than about $\frac{1}{25}$ microns$^{-1}$, sparkle amplitude drops very quickly. Parasitic reflections get blurred in much larger angle in the second cutoff frequency/period regime. Thus, in some embodiments, the antiglare surface described herein has a roughness cutoff frequency of greater than about $\frac{1}{50}$ microns$^{-1}$ and, in some embodiments, greater than about $\frac{1}{25}$ microns$^{-1}$.

Anti-glare surface parameters can be affected by various display design elements. In addition to the display pixel size and optical distance between the image plane and anti-glare surface previously described herein, the method of attaching the cover glass to the display can also influence the final anti-glare surface parameters. In general, RMS surface roughness in the range of 80-160 nm described hereinabove is most applicable to a "direct bond" display design, in which the cover glass/transparent glass substrate having the antiglare surface is directly bonded to the front of the display image-forming layers using an optical adhesive. The direct bond configuration minimizes reflections from the back surface of the glass. Minimal roughness also minimizes sparkle. Thus, the antiglare surface should have a "minimal" acceptable RMS roughness—i.e., the RMS roughness should be sufficient to provide the anti-glare effect over the range of intended viewing angles of the device. Higher levels of roughness (e.g., 120-300 nm RMS) may be needed in devices that employ an "air gap" between the cover glass and the image-forming display layers, because a flat back surface of the glass (or flat surface of films applied to the back of the glass) can create reflections that will only be diffused when using a higher roughness on the front antiglare surface of the glass. Alternatively, an antiglare surface can be provided, either directly on the glass surface or through using attached films, on the back surface (i.e., the surface of the glass substrate opposite the antiglare surface) of the glass. Whereas inclusion of the air gap design in a display assembly may be preferable for mechanical or electrical reasons, a direct bond design is most preferred with the transparent glass substrate and display assembly described herein, as it allows the use of an antiglare surface having a minimal roughness level, which will also minimize sparkle, for a given specular reflection target.

The antiglare surface having the properties described herein may be obtained using a variety of etching processes. Non-limiting examples of such processes are described in U.S. patent application Ser. No. 12/858,544, filed on Aug. 18, 2010, by Krista L. Carlson et al., and entitled "Glass and Display Having Antiglare Properties;" U.S. patent application Ser. No. 12/730,502, filed on Sep. 30, 2010, by Krista L. Carlson et al., and entitled "Glass Having Antiglare Surface and Method of Making;" U.S. Provisional Patent Application No. 61/329,936, filed on Apr. 30, 2010, by Diane K. Guilfoyle et al., and entitled "Antiglare Treatment Method and Articles Thereof;" U.S. Provisional Patent Application No. 61/372,655, filed on Aug. 11, 2010, by Diane K. Guilfoyle et al., and entitled "Antiglare Treatment Method and Articles Thereof;" and U.S. Provisional Patent Application No. 61/329,951, filed on Apr. 30, 2010, by Jeffrey T. Kohli et al., and entitled "Antiglare Surface and Method of Making," the contents of which are incorporated herein by reference in their entirety.

U.S. patent application Ser. Nos. 12/858,544 and 12/730, 502 describe methods in which a glass surface is treated with a first etchant to form crystals on the surface. A region of the surface adjacent to each of the crystals is then etched to a desired roughness, followed by removing the crystals from the glass surface, and reducing the roughness of the surface of the glass substrate to provide the surface with a desired haze and gloss.

In one non-limiting example, the multistep treatment described in U.S. patent application Ser. Nos. 12/858,544 and 12/730,502 comprises a first roughening step in which the glass substrate is immersed in a first bath or otherwise contacts a solution, gel, or paste comprising 5-20 wt % ammonium bifluoride ($NH_4HF_2$), 0-5 wt % of a fluorinated or non-fluorinated alkali or alkaline earth salt (e.g., $NaHF_2$ or $CaCl_2$), and 10-40% of an organic solvent such as isopropyl alcohol or propylene glycol. These crystals are later removed by rinsing with water or by subsequent chemical treatment steps. An optional second step may include immersion or other treatment in a second solution comprising a non-fluorinated mineral acid such as sulfuric acid, hydrochloric acid, nitric acid, phosphoric acid, or the like. Alternatively, the second solution may be water only. This optional second step can serve to either partially or entirely remove crystals from the glass surface. An optional third step (or second step, if the second step described above is omitted), may involve immersion or other treatment with an acidic solution containing 2-10 wt % hydrofluoric acid and 2-30 wt % of a mineral acid such as hydrochloric acid, sulfuric acid, nitric acid, phosphoric acid, or the like. This optional third step may also involve treatment with a basic solution instead of an acidic solution, such as a solution containing NaOH and EDTA.

U.S. Provisional Patent Application Nos. 61/329,936, 61/372,655, and 61/329,951 describe acidic and basic etch processes and the use of masks comprising polymer or wax coatings, particles, and combinations thereof to control the degree of etching of the glass surface. U.S. Provisional Patent Application Nos. 61/329,936 and 61/372,655 describe wet etch methods for generating an anti-glare surface in which particles are deposited on at least one surface of the glass. The at least one surface of the article having the deposited particles is brought into contact with an etchant (e.g., an etchant comprising HF and $H_2SO_4$) to form the anti-glare surface. The deposited particles may, for example, have a $D_{50}$ diameter of from about 0.1 μm to about 10 μm, from about 0.1 μm to about 50 μm, from about 1 μm to about 10 micrometers, or from about 1 μm to about 5 μm. The particles may be deposited, for example, on at the surface of the glass by forming a concentrated liquid suspension of the particles, diluting the concentrated suspension with a diluent, and contacting the surface with the diluted suspension. The deposited particles may, for example, comprise a glass, a composite, a ceramic, a plastic or resin based material, combinations thereof, or the like. In some embodiments, the etchant may comprise at least one acid suitable for etching the surface beneath the deposited particles. Non-limiting examples of such etchants are described in the references cited hereinabove (e.g., $HF/H_2SO_4$ etchants).

U.S. Provisional Patent Application No. 61/329,951 describes a method of making an article having an anti-glare surface, in which a protective film is formed on at least a portion of at least one surface of the article. The surface having the protective film is brought into contact with a liquid etchant to roughen the surface. In some embodiments, the protective film may be a pore-forming polymer such as, for example, at least one of a sulfonamide formaldehyde resin, a nitrocellulose, a polymer or copolymer including an acrylate or acrylic monomer or salts thereof, a lacquer, an enamel, a wax, combinations thereof, or the like. In some embodiments, the protective film or pore-forming polymer may comprise any suitable coating material such as, for example, at least one polymer, or a combination of polymers, like natural or synthetic materials, or combinations thereof. Suitable pore-former compositions, which can provide durable yet removable porous coatings may include, but are not limited to, any polymer or polymer formulation, or like material or mixtures, having film-forming and pore-forming properties, such as TSO-3100 DOD ink (an ethanol isopropyl-based jettable ink from Diagraph), acetone-based o/p-toluene sulfonamide formaldehyde resins, a nitrocellulose, an acrylate polymer, an acrylate copolymer, a lacquer (a polymer dissolved in a volatile organic compound) formulation, an enamel, a wax, combinations thereof, or the like.

In some embodiments, the antiglare surfaces described herein may be formed by combining the teachings of the references cited and incorporated hereinabove. In particular embodiments, the antiglare surface may be formed by combining the deposition of particles on a surface of the transparent glass substrate, as described in U.S. Provisional Patent Application Nos. 61/329,936 and 61/372,655, and the deposition of a protective polymeric film, as described in U.S. Provisional Patent Application No. 61/329,951, and subsequently etching the surface to form one of the antiglare surfaces described hereinabove.

In some embodiments, the transparent glass substrate and antiglare surface described herein have a 20° distinctness of reflected image (DOI) of less than about 90. In some embodiments, the DOI of the transparent glass sheet is less than about 80; in other embodiments, less than about 60; and, in other embodiments, less than about 40. As used herein, the term "distinctness of reflected image" is defined by method A of ASTM procedure D5767 (ASTM 5767), entitled "Standard Test Methods for Instrumental Measurements of Distinctness-of-Image Gloss of Coating Surfaces," the contents of which are incorporated herein by reference in their entirety.

In some embodiments, the transparent glass substrate comprises an ion exchangeable glass and is strengthened by either chemical or thermal means that are known in the art. In one embodiment, the transparent glass substrate is chemically strengthened by ion exchange. In this process, metal ions at or near a surface of the glass are exchanged for larger metal ions having the same valence as the metal ions in the glass. The exchange is generally carried out by contacting the glass with an ion exchange medium such as, for example, a molten salt bath that contains the larger metal ion. The metal ions are typically monovalent metal ions such as, for example, alkali metal ions. In one non-limiting example, chemical strengthening of a glass substrate containing sodium ions by ion exchange is accomplished by immersing the glass substrate in an ion exchange bath comprising a molten potassium salt such as potassium nitrate ($KNO_3$) or the like.

The replacement of small metal ions by larger metal ions in the ion exchange process creates in a region in the glass that extends from the surface to a depth (referred to as the "depth of layer") that is under compressive stress. This compressive stress at the surface of the transparent glass substrate is balanced by a tensile stress (also referred to as "central tension") within the interior of the glass substrate. In some embodiments, the surface of the transparent glass substrate described herein, when strengthened by ion exchange, has a compressive stress of at least 350 MPa, and the region under compressive stress extends to a depth of layer of at least 15 μm below the surface.

In some embodiments, the transparent glass substrate comprises a soda lime glass, an alkali aluminosilicate glass, or an alkali aluminoborosilicate glass. In one embodiment, the transparent glass substrate comprises an alkali aluminosilicate glass that comprises alumina, at least one alkali metal and, in some embodiments, greater than 50 mol %, $SiO_2$, in other embodiments, at least 58 mol %, and in still other embodiments, at least 60 mol % $SiO_2$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides. This glass, in particular embodiments, comprises, consists essentially of, or consists of: about 58 mol % to about 72 mol % $SiO_2$; about 9 mol % to about 17 mol % $Al_2O_3$; about 2 mol % to about 12 mol % $B_2O_3$; about 8 mol % to about 16 mol % $Na_2O$; and 0 mol % to about 4 mol % $K_2O$, wherein the ratio $$\frac{Al_2O_3(\text{mol \%}) + B_2O_3(\text{mol \%})}{\sum \text{alkali metal modifiers (mol \%)}} > 1,$$

where the modifiers are alkali metal oxides.

In another embodiment, the transparent glass substrate comprises an alkali aluminosilicate glass comprising, consisting essentially of, or consisting of: about 61 mol % to about 75 mol % $SiO_2$; about 7 mol % to about 15 mol % $Al_2O_3$; 0 mol % to about 12 mol % $B_2O_3$; about 9 mol % to about 21 mol % $Na_2O$; 0 mol % to about 4 mol % $K_2O$; 0 mol % to about 7 mol % MgO; and 0 mol % to about 3 mol % CaO.

In yet another embodiment, the transparent glass substrate comprises an alkali aluminosilicate glass comprising, consisting essentially of, or consisting of: about 60 mol % to about 70 mol % $SiO_2$; about 6 mol % to about 14 mol % $Al_2O_3$; 0 mol % to about 15 mol % $B_2O_3$; 0 mol % to about 15 mol % $Li_2O$; 0 mol % to about 20 mol % $Na_2O$; 0 mol % to about 10 mol % $K_2O$; 0 mol % to about 8 mol % MgO; 0 mol % to about 10 mol % CaO; 0 mol % to about 5 mol % $ZrO_2$; 0 mol % to about 1 mol % $SnO_2$; 0 mol % to about 1 mol % $CeO_2$; less than about 50 ppm $As_2O_3$; and less than about 50 ppm $Sb_2O_3$; wherein 12 mol %≤$Li_2O+Na_2O+K_2O$≤20 mol % and 0 mol %≤MgO+CaO≤10 mol %.

In still another embodiment, the transparent glass substrate comprises an alkali aluminosilicate glass comprising, consisting essentially of, or consisting of: about 64 mol % to about 68 mol % $SiO_2$; about 12 mol % to about 16 mol % $Na_2O$; about 8 mol % to about 12 mol % $Al_2O_3$; 0 mol % to about 3 mol % $B_2O_3$; about 2 mol % to about 5 mol % $K_2O$; about 4 mol % to about 6 mol % MgO; and 0 mol % to about 5 mol % CaO, wherein: 66 mol %≤$SiO_2+B_2O_3+CaO$≤69 mol %; $Na_2O+K_2O+B_2O_3+MgO+CaO+SrO$>10 mol %; 5 mol %≤MgO+CaO+SrO≤8 mol %; ($Na_2O+B_2O_3$)—$Al_2O_3$≤2 mol %; 2 mol %≤$Na_2O$—$Al_2O_3$≤6 mol %; and 4 mol %≤($Na_2O+K_2O$)—$Al_2O_3$≤10 mol %.

In other embodiments, the transparent glass substrate comprises $SiO_2$, $Al_2O_3$, $P_2O_5$, and at least one alkali metal oxide ($R_2O$), wherein 0.75≤[($P_2O_5$ (mol %)+$R_2O$ (mol %))/$M_2O_3$ (mol %)]≤1.2, where $M_2O_3$=$Al_2O_3+B_2O_3$. In some embodiments, [($P_2O_5$ (mol %)+$R_2O$ (mol %))/$M_2O_3$ (mol %)]=1 and, in some embodiments, the glass does not include $B_2O_3$ and $M_2O_3$=$Al_2O_3$. The glass comprises, in some embodiments: about 40 to about 70 mol % $SiO_2$; 0 to about 28 mol % $B_2O_3$; about 0 to about 28 mol % $Al_2O_3$; about 1 to about 14 mol % $P_2O_5$; and about 12 to about 16 mol % $R_2O$. In some embodiments, the glass comprises: about 40 to about 64 mol % $SiO_2$; 0 to about 8 mol % $B_2O_3$; about 16 to about 28 mol % $Al_2O_3$; about 2 to about 12 mol % $P_2O_5$; and about 12 to about 16 mol % $R_2O$. The glass may further comprise at least one alkaline earth metal oxide such as, but not limited to, MgO or CaO.

In some embodiments, the glass comprising the transparent glass substrate is free of lithium; i.e. the glass comprises less than 1 mol % $Li_2O$ and, in other embodiments, less that 0.1 mol % $Li_2O$ and, in other embodiments, o0 mol % $LI_2O$. In some embodiments, such glasses are free of at least one of arsenic, antimony, and barium; i.e. the glass comprises less than 1 mol % and, in other embodiments, less than 0.1 mol % of $As_2O_3$, $Sb_2O_3$, and/or BaO.

While typical embodiments have been set forth for the purpose of illustration, the foregoing description should not be deemed to be a limitation on the scope of the disclosure or appended claims. Accordingly, various modifications, adaptations, and alternatives may occur to one skilled in the art without departing from the spirit and scope of the present disclosure or appended claims.

The invention claimed is:

1. A transparent glass substrate having an antiglare surface, the antiglare surface comprising:
   a roughened surface, the roughened surface having a roughness and an RMS amplitude of at least about 80 nm; and
   a frequency cutoff of less than about [1/(0.081·RMS)], wherein the frequency cutoff is a frequency ν at which the power spectral density of the roughness falls below $1/e^2$ and is expressed in 1/microns ($\mu m^{-1}$) and RMS is the RMS amplitude of the roughened surface, expressed in nanometers.

2. The transparent glass substrate of claim 1, wherein the antiglare surface further includes an unroughened surface portion, wherein the unroughened surface portion forms a fraction of the antiglare surface of up to about 0.2, and wherein the roughened surface forms a remaining fraction of the antiglare surface.

3. The transparent glass substrate of claim 2, wherein the fraction of the antiglare surface formed by the unroughened surface portion is less than or equal to about 0.1.

4. The transparent glass substrate of claim 1, wherein the antiglare surface is integral to the transparent glass substrate.

5. The transparent glass substrate of claim 1, wherein the antiglare surface, when placed in front of a pixelated display at an optical distance D, expressed in millimeters, the pixelated display having a plurality of pixels having a pixel pitch P expressed in microns, has a cutoff period, wherein the cutoff period is the inverse of the cutoff frequency ν and is expressed in microns, of greater than [(280/P)·(0.098·RMS−5.55)·D/3].

6. The transparent glass substrate of claim 1, wherein the antiglare surface, when placed in front of a pixelated display having a plurality of pixels, has a pixel power deviation of less than about 7%.

7. The transparent glass substrate of claim 1, wherein the antiglare surface has a distinctness of reflected image of less than about 90%.

8. The transparent glass substrate of claim 1, wherein the antiglare surface has a transmission haze of less than about 20%.

9. The transparent glass substrate of claim 1, wherein the transparent glass substrate comprises an alkali aluminosilicate glass.

10. The transparent glass substrate of claim 1, wherein the transparent glass substrate is ion exchanged.

11. The transparent glass substrate of claim 1, wherein the transparent glass substrate is a cover glass for a pixelated display.

12. A display assembly, the display assembly comprising:
a pixelated display, the pixelated display comprising a plurality of pixels having a pixel pitch; and
a transparent glass substrate having an antiglare surface, wherein the transparent glass substrate is disposed in front of the pixelated display and separated from the pixelated display by an optical distance D, expressed in millimeters, wherein the antiglare surface is opposite a surface of the transparent glass substrate facing the pixelated display, wherein the antiglare surface has a roughened surface, the roughened surface having an RMS amplitude of at least about 80 nm, and wherein the roughened surface has a cutoff frequency, wherein the cutoff frequency is a frequency ν at which the power spectral density of the roughness falls below $1/e^2$ and is expressed in 1/microns ($\mu m^{-1}$), of greater than [(280/P)·(0.098·RMS−5.55)·D/3], wherein each of the plurality of pixels having a pixel pitch P, expressed in microns, and RMS is the RMS amplitude of the roughened surface, expressed in nanometers.

13. The display assembly of claim 12, wherein the cutoff frequency is greater than about 1/50 microns$^{-1}$.

14. The display assembly of claim 12, wherein the antiglare surface has a pixel power deviation of less than about 7%.

15. The display assembly of claim 12, wherein the antiglare surface further includes an unroughened surface portion, wherein the unroughened surface portion forms a fraction of the antiglare surface of up to about 0.2, and wherein the roughened surface forms a remaining fraction of the antiglare surface.

16. The display assembly of claim 15, wherein the fraction of the antiglare surface formed by the unroughened surface portion is less than or equal to about 0.1.

17. The display assembly of claim 12, wherein the antiglare surface is integral to the transparent glass substrate.

18. The display assembly of claim 12, wherein the antiglare surface has a distinctness of image of less than about 90%.

19. The display assembly of claim 12, wherein the antiglare surface has a transmission haze of less than about 20%.

20. The display assembly of claim 12, wherein the transparent glass substrate comprises an alkali aluminosilicate glass.

21. The display assembly of claim 12, wherein the transparent glass substrate is ion exchanged.

* * * * *